United States Patent
Dahm et al.

(10) Patent No.: US 7,697,433 B2
(45) Date of Patent: Apr. 13, 2010

(54) METHOD AND SYSTEM FOR BYPASSING A CORE NETWORK IN ESTABLISHING A CALL BETWEEN ENDPOINTS ON DIFFERENT MEDIA GATEWAYS

(75) Inventors: Claus Dahm, San Jose, CA (US); Hisham Sami Abdelhamid, San Jose, CA (US); Joseph R. Stone, San Jose, CA (US); Rajesh Kumar, Palo Alto, CA (US)

(73) Assignee: Cisco Technology, Inc., San Jose, CA (US)

( * ) Notice: Subject to any disclaimer, the term of this patent is extended or adjusted under 35 U.S.C. 154(b) by 1078 days.

(21) Appl. No.: 11/012,372

(22) Filed: Dec. 14, 2004

(65) Prior Publication Data

US 2006/0126595 A1 Jun. 15, 2006

(51) Int. Cl.
*H04L 12/26* (2006.01)
*H04L 12/66* (2006.01)
*H04L 12/28* (2006.01)

(52) U.S. Cl. .................. 370/235; 370/356; 370/389; 370/395.2; 370/400; 379/221.01

(58) Field of Classification Search ............... None
See application file for complete search history.

(56) References Cited

U.S. PATENT DOCUMENTS 6,081,534 A  6/2000 Sipila ..................... 370/466
6,421,722 B1 * 7/2002 Bauer et al. ............... 709/224
6,510,219 B1 * 1/2003 Wellard et al. .......... 379/221.01
6,570,869 B1  5/2003 Shankar et al.
6,577,638 B1 * 6/2003 Tashiro et al. ............. 370/401
7,215,643 B2 * 5/2007 Mussman et al. .......... 370/237

OTHER PUBLICATIONS www.packetizer.com, "RFC 2705—Media Gateway Control Protocol (MGCP) Version 1.0," 10 pages total, www.packetizer.com/rfc/rfc2705, Oct. 1999.
www.umts-forum.org, "IMS the future proof platform for mobile multimedia," 24 pages total, Nov. 2004, www.umts-forum.org/servlet/dycon/2tumts/umts/live/en/umts/multimedia_presentations_IMS_HK_seminar_slides-ver2.pdf.
www.cablelabs.com, Fred Dawson, "European MSOs Looking to Speed Move to IPCablecom," 5 pages total, Cable Television Laboratories, Inc., Jul.-Aug. 2002 www.cablelabs.com/news/newsletter/SPECS/julyaugust2002/international.html.

* cited by examiner

*Primary Examiner*—Melanie Jagannathan
(74) *Attorney, Agent, or Firm*—Stolowitz Ford Cowger LLP

(57) ABSTRACT

A method and system for establishing a call between two endpoints residing on different media gateways in a decomposed voice over packet architecture. Cluster attributes identifying alternate bearer possibilities are exchanged between media gateways as part of capabilities negotiation which occurs during call setup conducted by an external call control element over a core network. The media gateways analyze the cluster attributes to determine whether bearer possibilities exist apart from the core network. If an alternate bearer possibility exists, the alternate is employed and the call is established via the alternate bearer directly between the media gateways, thus bypassing the core network.

25 Claims, 6 Drawing Sheets

METHOD AND SYSTEM FOR BYPASSING A CORE NETWORK IN ESTABLISHING A CALL BETWEEN ENDPOINTS ON DIFFERENT MEDIA GATEWAYS

FIELD OF THE INVENTION

Embodiments of the present invention relate to establishing a call bearing data between two endpoints. More specifically, embodiments of the present invention relate to establishing a call between two endpoints that are supported by separate media gateways, bypassing a core network.

BACKGROUND OF THE INVENTION

A current trend in the telecommunications industry utilizes a decomposed voice over packet architecture in which a call control functionality is performed by one element and the actual bearing of data is accomplished by a second element. Prior to this decomposition technique, call control and call bearing were performed by one element, and the way that element worked was proprietary and unique to each telecommunications provider. Now, there are industry-wide standards, the call control element has been separated (logically, and in some cases physically as well) from the call bearing element, and telecommunications providers can work together to devise solutions to satisfy the constant demand on the telecommunications industry to provide faster and more complex services.

A media gateway is a network element that provides conversion between media (voice, video, data, etc.) and data packets carried over a core packet (IP, ATM, etc.) network. A media gateway supports a collection of endpoints. An endpoint sources and/or sinks one or more media streams.

In a conventional decomposed voice over packet architecture, an external call control element typically establishes a call between two endpoints on different media gateways via the core packet network. The call control element is logically external to the media gateway, while it may or may not reside in the same physical box or location. The external call control element is typically unaware of any possible connection between two endpoints other than the core packet network. It is possible that the two endpoints reside within the same network device or within different network devices that are in close proximity to one another. Alternative connections between endpoints are called alternate bearer possibilities, and may include such connections as ATM, virtual channel or TDM networks, pre-resolved IP paths, MPLS or VLAN networks or pseudo-wires, among others. In a decomposed voice over packet architecture, the external call control element is typically unaware of these alternate bearer possibilities.

In the prior art, however, it is known for the external call control element to discern that if a call originates and terminates on the same media gateway, there is a bearer possibility other than the core packet network. Media gateway control protocols including Media Gateway Control Protocol (MGCP), Trunking Gateway Control Protocol (TGCP), Network-based Call Signaling (NCS), Megaco/H.248 and SIP define syntax and semantics which allow the external call control element to specify an alternate bearer possibility when a call originates and terminates on the same media gateway. However, these constructs cannot be used in conjunction with endpoints which reside on different media gateways.

SUMMARY OF THE INVENTION

Embodiments of the present invention, a method and system for establishing a call between endpoints on different media gateways, are presented. Cluster attributes identifying alternate bearer possibilities are exchanged between media gateways as part of capabilities negotiation which occurs during call setup conducted by an external call control element over a core network. The media gateways analyze the cluster attributes to determine whether bearer possibilities exist apart from the core network. If an alternate bearer possibility exists, the alternate is employed and the call is established via the alternate bearer directly between the media gateways, thus bypassing the core network.

BRIEF DESCRIPTION OF THE DRAWINGS

The accompanying drawings, which are incorporated in and form a part of this specification, illustrate embodiments of the invention and, together with the description, serve to explain the principles of the invention.

DETAILED DESCRIPTION

Reference will now be made in detail to various embodiments of the invention, examples of which are illustrated in the accompanying drawings. While the invention will be described in conjunction with various embodiments, it will be understood that they are not intended to limit the invention to these embodiments. On the contrary, the invention is intended to cover alternatives, modifications and equivalents, which may be included within the spirit and the scope of the invention as defined by the appended claims. Furthermore, in the following detailed description of the present invention, numerous specific details are set forth in order to provide a thorough understanding of the present invention. However, it will be apparent to one skilled in the art that the present invention may be practiced without these specific details. In other instances, well-known methods, procedures, components, structures and devices have not been described in detail so as to avoid unnecessarily obscuring aspects of the present invention.

Figure 1:
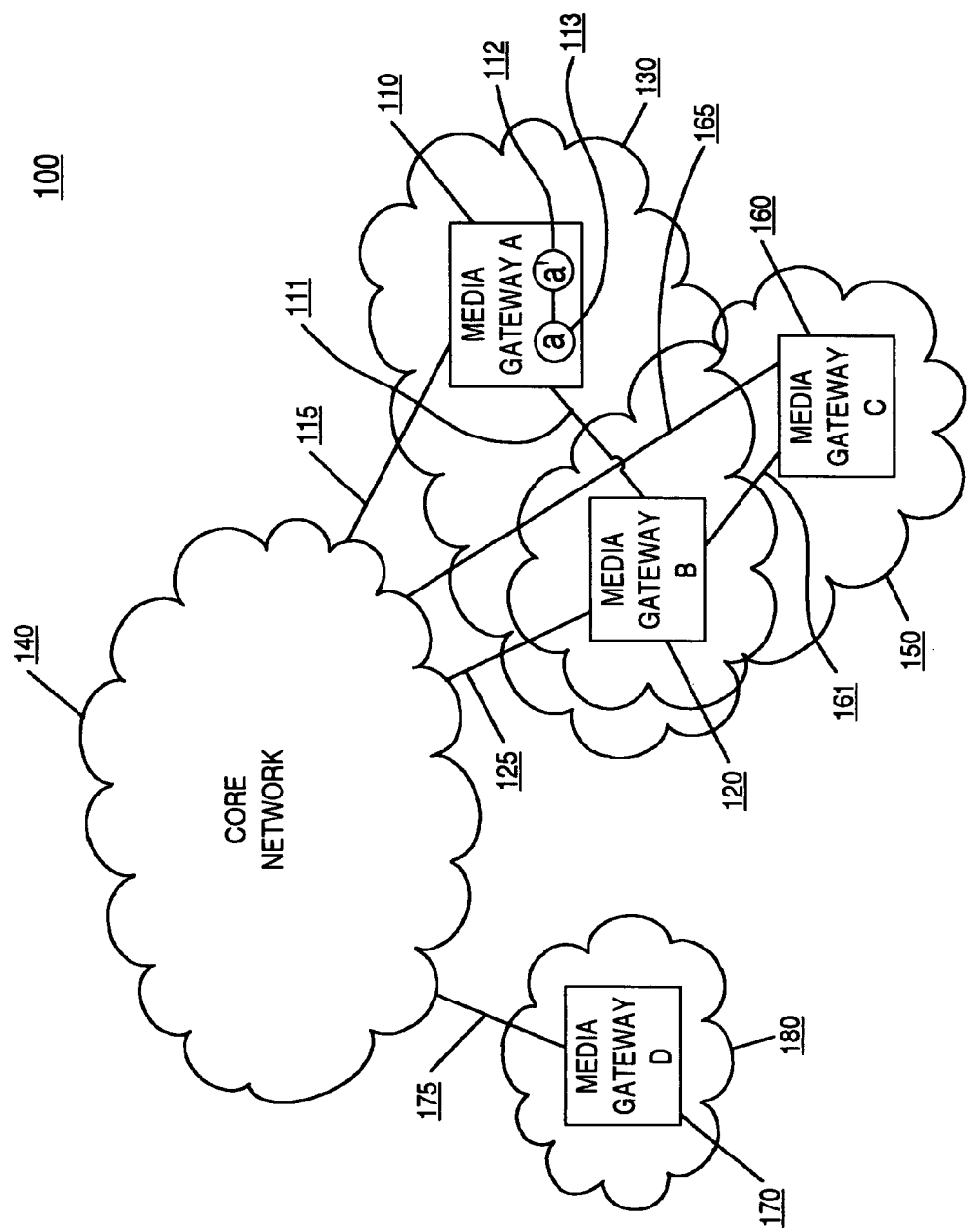
FIG. 1 is a block diagram of an exemplary telecommunications environment in which embodiments of the present invention can be practiced.

FIG. 1 is a schematic diagram of a telecommunications network [100]. The media gateways 110, 120, 160, 170 are communicatively coupled to the core network [140]. In one embodiment, core network [140] is a packet network such as an ATM network or an IP network. Each media gateway [120] supports at least one cluster [130]. A cluster [130] is a group of endpoints [112] which share a common bearer possibility. For example, media gateway A [110] supports endpoints "a" [113] and "a'" [112] which are part of cluster 130. Media gateway B [120] also supports endpoints which are part of cluster 130 as well as part of cluster 150. Because media gateway A [110] and media gateway B [120] both support endpoints within cluster 130, media gateway A [110] and media gateway B [120] are communicatively linked via physical or logical link [111]. Media gateway A [110] and media gateway B [120] share a link [111] because they both support endpoints in the same cluster [130]. This link [111] is capable of bearing data, just as the link [115] connecting media gateway A [110] to the core network [140] is capable of bearing data. The link [111] between media gateway A [110] and media gateway B [120] via their shared cluster [130] serves as an alternative bearer possibility to the combination of links [115 and 125] which connect media gateway A [110] and media gateway B [120] via the core network [140].

Media gateway C [160] supports endpoints which are part of cluster 150, thus media gateway C [160] and media gateway B [120] are communicatively linked via link [161]. Media gateway C [160] and media gateway B [120] share an alternate bearer possibility [161]. Media gateway C [160] and media gateway A [110] do not support endpoints which are part of the same cluster. Media gateway A [110] and media gateway C [160] can communicate via core network 140. However, there is no alternate bearer possibility for establishing a call between endpoints supported by media gateway A [110] and endpoints supported by media gateway C [160].

Media gateway D [170] supports endpoints which are part of cluster 180. Cluster 180 does not share endpoints with cluster 150 or cluster 130. Endpoints supported by media gateway D [170] may participate in calls with endpoints in media gateway A [110], B [120] or C [160] via the core network [140], but there are no alternate bearer possibilities for such calls.

As illustrated at media gateway B [120], clusters may overlap. Endpoints supported by media gateway B [120] may have membership in cluster 150 and cluster 130. Clusters may also be nested (not depicted in FIG. 1). By nested it is meant that one cluster is entirely within another cluster.

Figure 2:
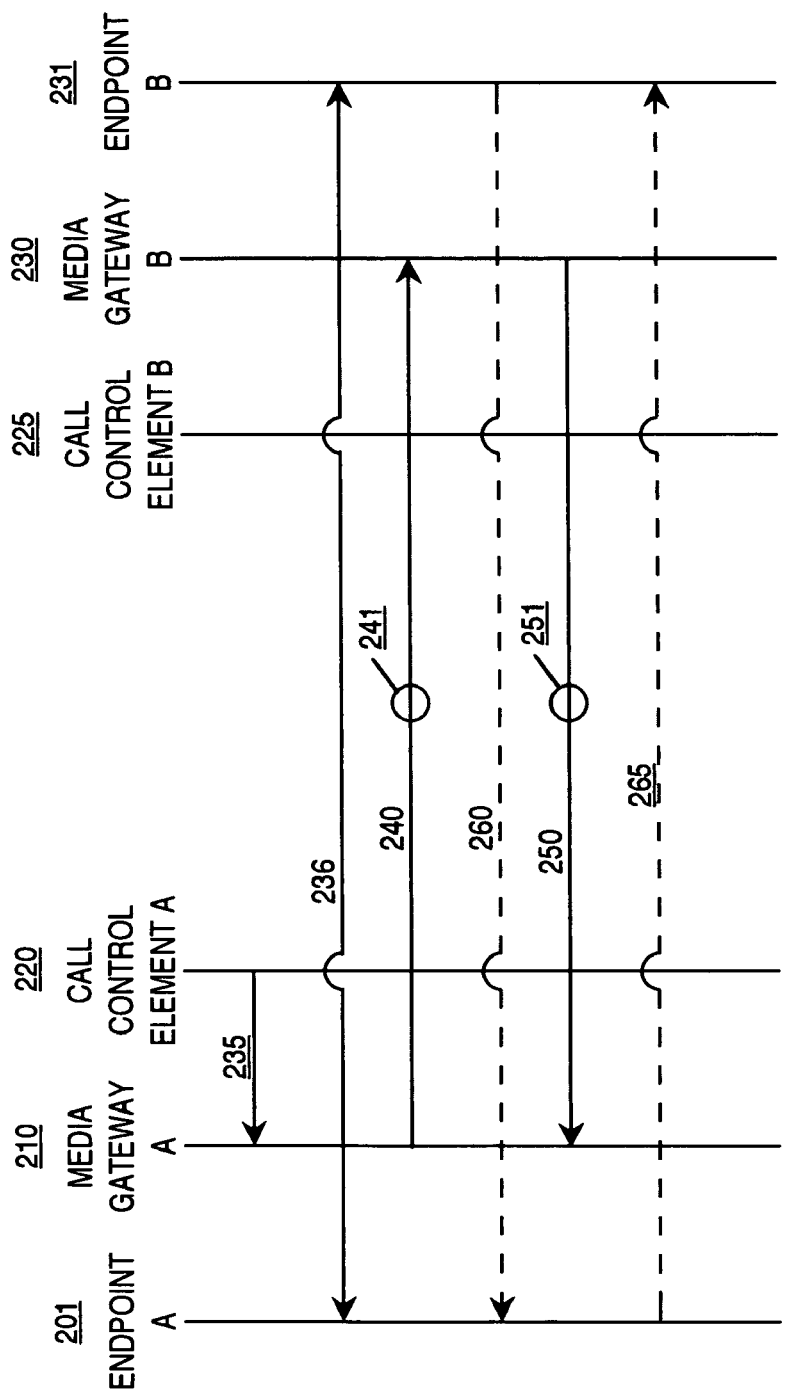
FIG. 2 is a schematic of a call flow between two media gateways, in accordance with an embodiment of the present invention.

FIG. 2 illustrates a call flow [200] for establishing a call between endpoint A [supported by media gateway A [210] and an endpoint supported by media gateway B [230], in accordance with an embodiment of the present invention. First, an establish request [235] is sent to media gateway A [210] by call control element [220]. Establish request 235 requests a call between an endpoint supported by media gateway A [210], referred to as the originating endpoint, and an endpoint supported by media gateway B [230], referred to as the terminating endpoint.

Referring to FIG. 2, upon receiving the establish request, media gateway A [210] sends establish response [240] back to call control element A [220]. In one embodiment, establish response [240] includes a cluster attribute [241] indicating a cluster to which the originating endpoint belongs. The cluster attribute contains a cluster ID and optionally cluster member ID. For example, with a SDP-based (RFC 2327) gateway control protocol such as MGCP, TGCP, NCS, Megaco/H.248, SIP, etc., the cluster attribute could be defined as:

a=X-cluster:<cluster ID type><cluster ID Format><cluster ID length> [<cluster Member ID>]

In this example, the cluster ID type sub-field is a text string giving the type of the cluster ID and cluster member ID. Cluster ID types may include Internet Protocol (IN), Asynchronous Transfer Mode (ATM), Multi-Protocol Label Switching (MPLS), Layer Two Tunneling Protocol (L2TP), etc. The cluster ID format sub-field is a text string giving the format of the cluster ID and cluster member ID. Cluster formats may include "IP4," "IP6," "NSAP," "ASCII," Label-Switched Path (LSP), pseudo-wire (PW), etc. The cluster ID length sub-field specifies the leftmost portion of the cluster member ID that constitutes the cluster ID. For example, with a cluster ID type/format of "IN IP4," "IN IP6," "ATM NSAP," etc., the cluster ID length is expressed in terms of bits. With a cluster ID type/format of "STRING ASCII," the cluster ID length is expressed in terms of ASCII characters.

The cluster member ID sub-field is an optional text string identifying the specific member within the cluster. The cluster member ID may be omitted if the <cluster ID type> and <cluster ID format> of the X-cluster attribute match the <network type> and <address type> of the standard connection data field:

c=<network type><address type><connection address>

The connection data field is taken from either the media description or the connection description, per the rules of RFC 2327. The <cluster member ID> sub-field is mandatory with a cluster ID type/format of "STRING ASCII."

In one embodiment, the originating call leg 236 is established between endpoint A [201] and endpoint B [231] via the core network before it is determined whether or not media gateway A [210] and media gateway B [230] share an alternate bearer possibility. Once it is determined that an alternate bearer possibility exists, the originating call leg [260] is re-established via the alternate bearer.

Referring to FIG. 1, the cluster attribute indicates that the originating endpoint [112] belongs to cluster 130. Referring back to FIG. 2, the establish response [240] bearing the cluster attribute [241] is passed transparently to media gateway B [230] as part of the establish request to media gateway B, in accordance with the typical capabilities negotiation/exchange associated with conventional call setup. In one embodiment, a call control element B [225] receives and relays this establish request [240] to media gateway B [225]. Call control elements A [220] and B [225] may be unaware of the cluster membership of the originating and terminating endpoints.

In one embodiment of the present invention, upon receiving cluster attribute 241, media gateway B [230] determines whether or not the terminating endpoint is a part of the cluster or clusters indicated by cluster attribute 241. Media gateway B [230] then sends establish response [250] to the call control element A [220] including cluster attribute 251 which indicates which cluster or clusters the terminating endpoint belongs to. Upon receiving cluster attribute 251, media gateway A [210] determines whether the originating endpoint belongs to any of the clusters indicated by cluster attribute 251. There may be one alternate bearer possibility, multiple alternate bearer possibilities, or no alternate bearer possibilities.

If the originating endpoint and the terminating endpoint share a cluster membership, e.g., they share one or more alternate bearer possibilities, originating call leg 260 is established via one of the alternate bearer possibilities, bypassing the core network. Terminating call leg 265 is also established via one of the alternate bearer possibilities, bypassing the core network. If there is no alternate bearer possibility, the terminating call leg would be established via the core network and through call control element A [220].

In one embodiment of the present invention, media gateway A [210] and media gateway B [230] are capable of determining which alternate bearer possibility presents the lowest cost option when there are multiple alternate bearer possibilities. Cost can be measured in terms of latency, bandwidth, equipment, etc. If the originating and terminating endpoints share membership in more than one cluster, originating call leg 260 is established via the most cost-efficient alternate bearer possibility, in this embodiment. However, it is not a requirement that the most cost-efficient solution be used.

Figure 3:
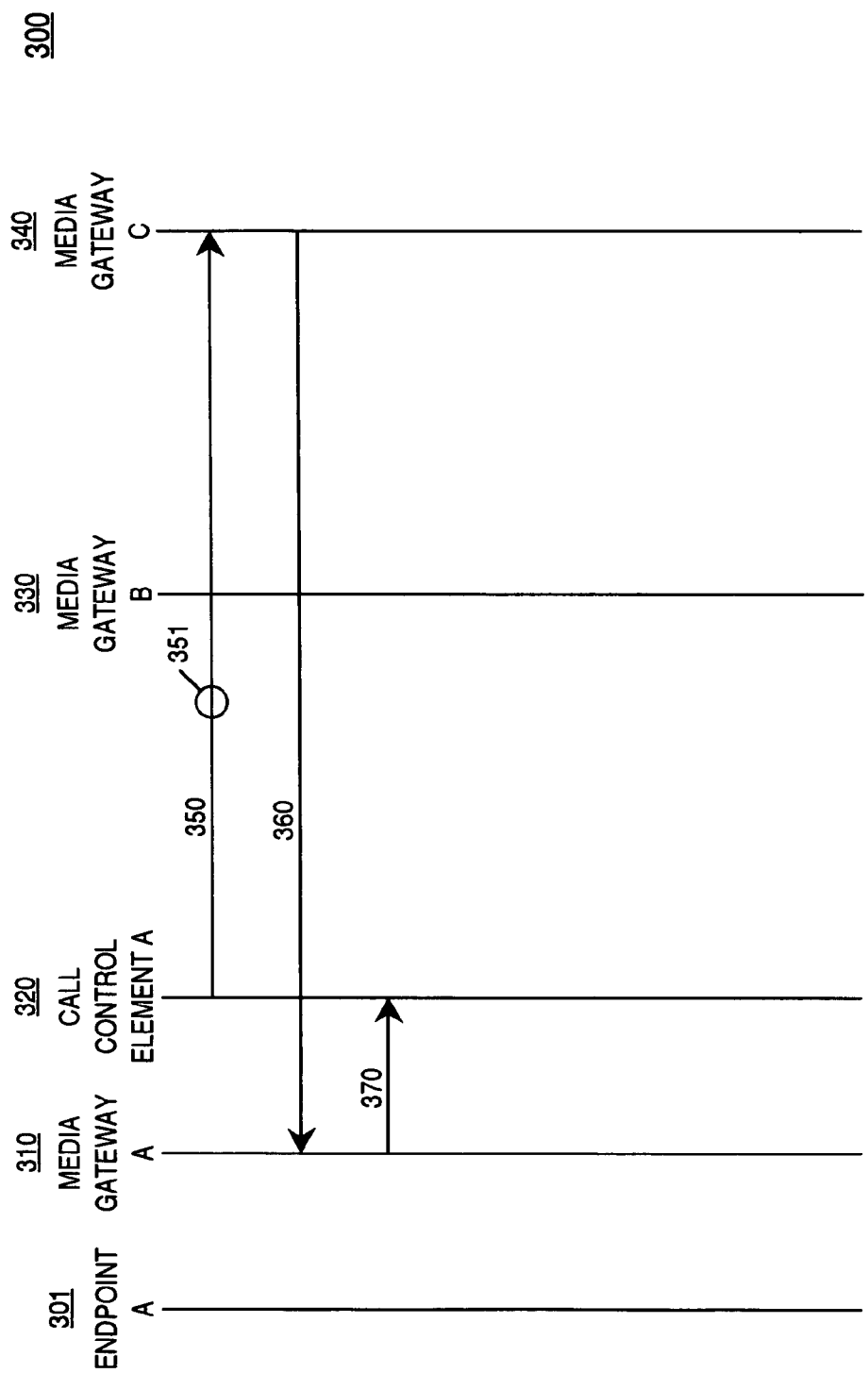
FIG. 3 is a schematic of modifying call flow with a new remote cluster attribute, in accordance with an embodiment of the present invention.

A call leg may be modified with a new remote cluster attribute, for example in the case of call forwarding. The media gateways will maintain the alternate bearer or revert to the core packet network depending on the new cluster ID. As depicted in the call flow [300] in FIG. 3, it is possible that a call could be forwarded from media gateway B [330], which does reside in a same cluster as media gateway A [310], to media gateway C [340], which does not reside in a same cluster as media gateway A [310]. Call control element A [320] establishes the call [350] with media gateway C [340]. The cluster attribute [351] provided by media gateway A [310] is transparently conveyed to media gateway C [340]. Media gateway C [340] then identifies the cluster membership of media gateway A [310]. In one embodiment, media gateway C [340] then makes the determination that media gateway C [340] and media gateway A [310] do not share cluster membership. Thus, media gateway C [340] establishes the subsequent call leg [360] through call control element A [320] via the core network. Any subsequent call legs [370] are in turn established through the call control element A [320] via the core network.

Figure 4:
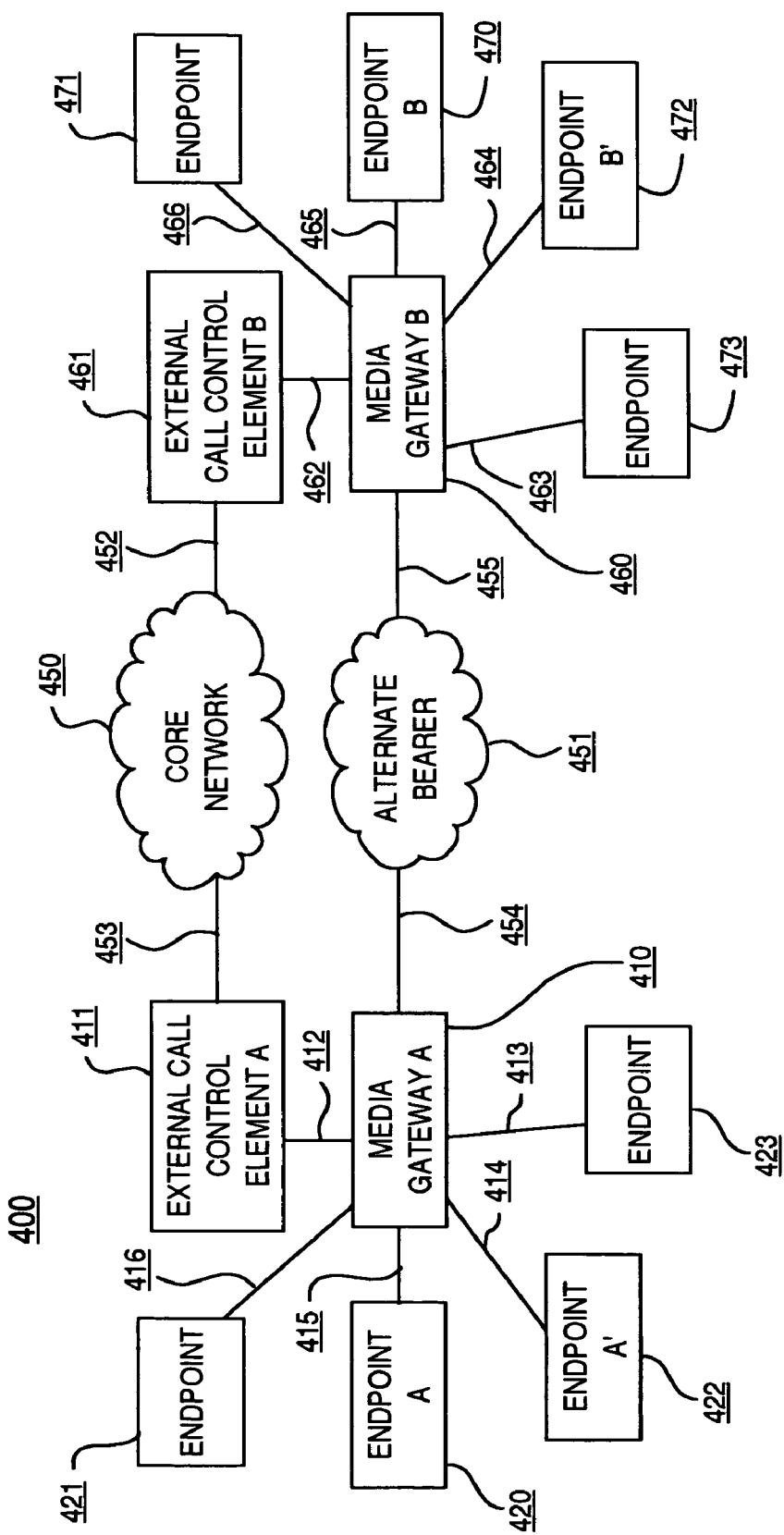
FIG. 4 is a block diagram depicting a decomposed voice over packet architecture on which embodiments of the present invention can be practiced.

FIG. 4 is a block diagram illustrating a decomposed voice over packet architecture for establishing a call between an originating endpoint 420 supported by an originating media gateway 410 and a terminating endpoint 470 supported by a terminating media gateway 460, in accordance with an embodiment of the present invention. External call control element A 411 is communicatively linked with core network 450 via link 453. External call control element A 411 is communicatively linked with originating media gateway 410 via link 412. Originating media gateway 410 is communicatively linked with terminating media gateway 460 via alternate bearer 451.

Endpoints [e.g. 421] supported by originating media gateway A [410] are members of the same cluster as endpoints [e.g. 471] supported by terminating media gateway B [460]. If a call is desired between originating endpoint 420 and terminating endpoint 470, there is more than one way to establish the call. The call could be conducted by an external call control element [411] via core network 450, Utilizing embodiments of the present invention, the call is conducted by originating media gateway 410 and terminating media gateway 460 via alternate bearer 451. A call conducted in the latter manner would bypass core network 450.

Figure 5:
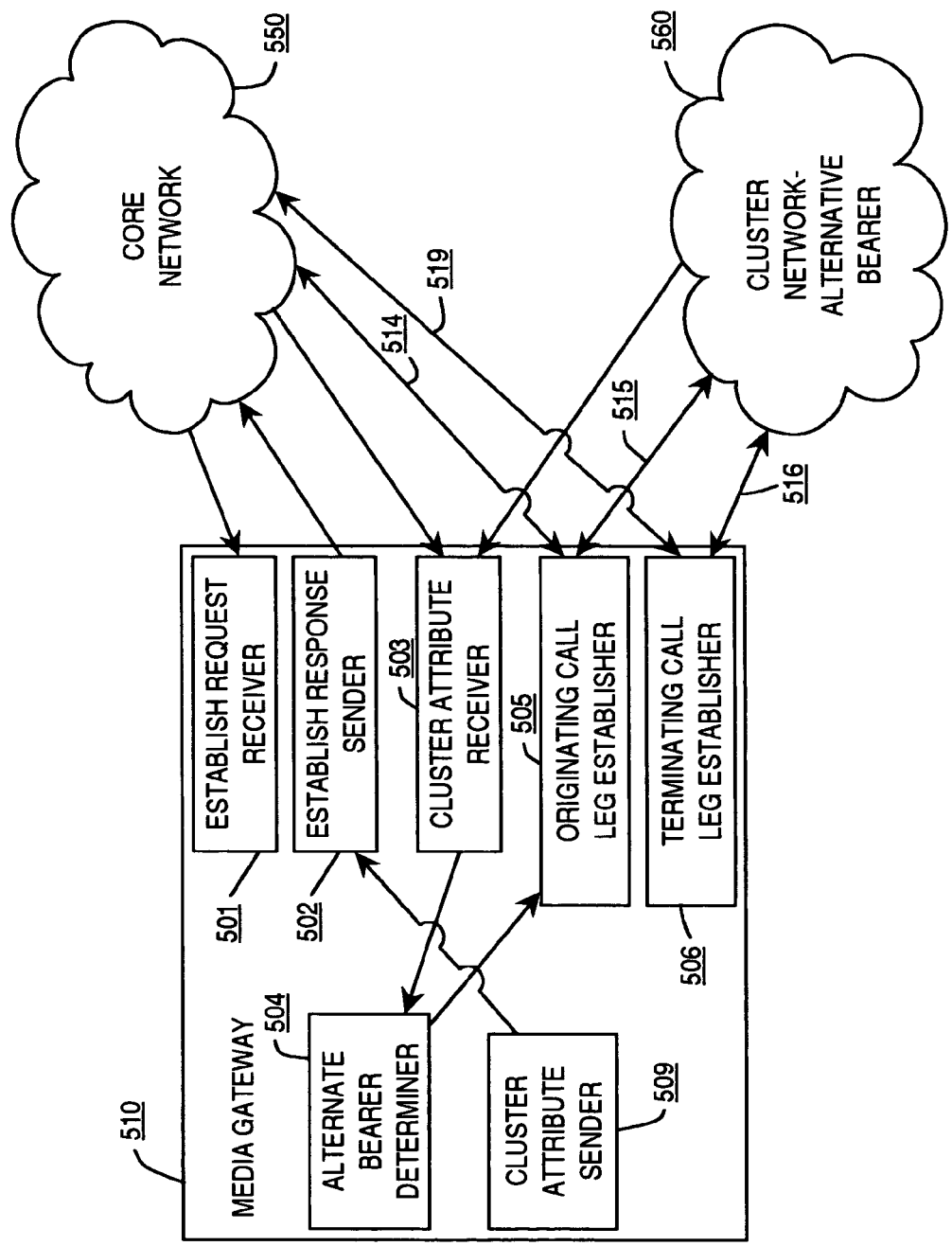
FIG. 5 is a block diagram of a media gateway, in accordance with an embodiment of the present invention.

FIG. 5 is a block diagram depicting a media gateway 510 in accordance with an embodiment of the present invention. Media gateway 510 has an establish request receiver 501 for receiving establish requests from core network 550. Establish response sender 502 sends an establish response back to core network 550. Cluster attribute receiver 503 receives cluster attributes which indicate cluster membership of other endpoints associated with a call. Alternate bearer determiner 504 determines whether endpoints supported by media gateway 510 are members of the same clusters as other endpoints associated with the call. Cluster attribute sender 509 prepares the cluster ID information to send along with the establish response. First call leg establisher 505 establishes first call legs via cluster network 560. Second call leg establisher 506 establishes second call legs via cluster network 560.

Figure 6:
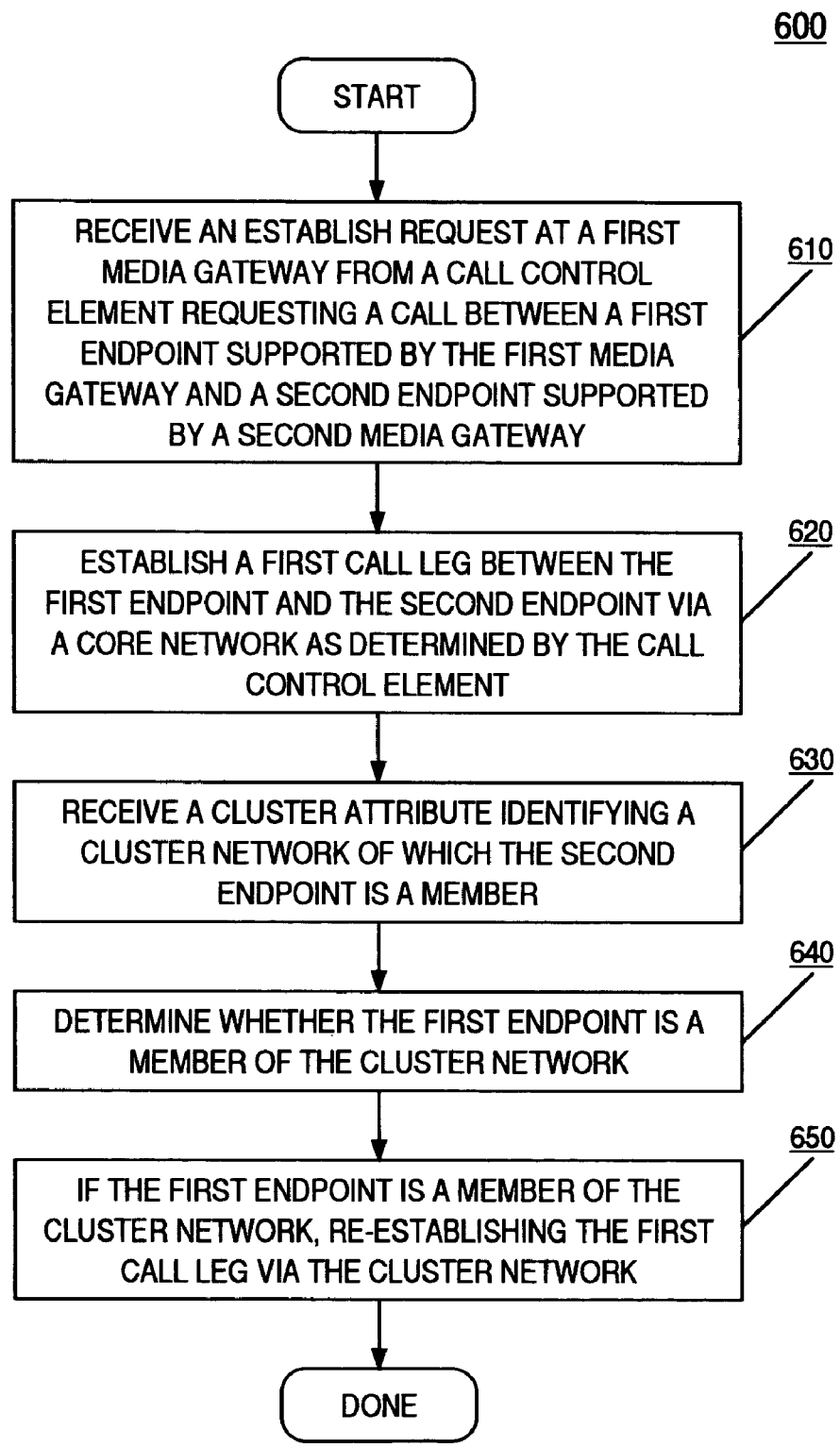
FIG. 6 is a flowchart illustrating the process of establishing a call between two endpoints by utilizing an alternate bearer possibility, in accordance with an embodiment of the present invention.

FIG. 6 is a flowchart illustrating a method for establishing a call between endpoints which are supported by different media gateways, in accordance with an embodiment of the present invention. Step 610 is receiving an establish request at a first media gateway from a call control element. The establish request in step 610 requests a call between a first, or originating endpoint supported by an originating media gateway and a second, or terminating endpoint supported by a terminating media gateway. As depicted in step 620, a first, or originating call leg is established between the originating and terminating endpoints via the core network as determined by the call control element.

Step 630 in FIG. 6 illustrates that the originating media gateway then receives a cluster attribute which identifies the cluster or clusters to which the terminating endpoint belongs. The originating media gateway then determines, as step 640 depicts, whether the originating endpoint is a member of the cluster indicated by the cluster attribute conveyed in step 630. Then, in step 650, if the originating endpoint is a member of a same cluster as the terminating endpoint, the originating call leg is re-established via the shared cluster. In one embodiment of the present invention, when there is an alternate bearer possibility, the terminating call leg is automatically established with respect to the alternate bearer before the originating call leg is re-established with respect to the alternate bearer.

The foregoing descriptions of specific embodiments of the present invention have been presented for purposes of illustration and description. They are not intended to be exhaustive or to limit the invention to the precise forms disclosed. Many modifications and variations are possible in light of the above teachings. The embodiments were chosen and described in order to best explain the principles of the invention and its practical application, to thereby enable others skilled in the art to best utilize the invention and various embodiments with various modifications as are suited to the particular use contemplated. It is intended that the scope of the invention be defined by the Claims appended hereto and their equivalents.

What is claimed is:

1. A method comprising:
   setting up a call between an originating endpoint supported by an originating media gateway and a terminating endpoint supported by a terminating media gateway;
   wherein the originating media gateway is communicatively coupled with a core network via a first external call control element and wherein the terminating media gateway communicates with the core network via a second external call control element;
   determining cluster attributes corresponding to the originating and terminating endpoints at respective supporting media gateways wherein a cluster comprises a plurality of endpoints that share a common alternate bearer, wherein an alternate bearer comprises a common media gateway or media gateway group, wherein the media gateway group comprises a mesh of interconnected media gateways operable to communicate with each other independently of the core network and the first and second external call control elements;
   exchanging the cluster attributes of the originating endpoint and the terminating endpoint identifying one or more clusters to which the originating endpoint and the terminating endpoint belong wherein the cluster attributes are transparent to the external call control elements;

analyzing the cluster attributes to determine if the originating endpoint and the terminating endpoint both belong to a common cluster;

wherein if the originating endpoint and the terminating endpoint belong to the common cluster then establishing the call independent of the first and second external call control elements via a corresponding alternate bearer to bypass the core network, else establishing the call via the core network using the first and second external call control elements.

2. The method of claim 1 wherein the cluster attributes are exchanged between the originating media gateway and the terminating media gateway by an external call control element via the core network.

3. The method of claim 1 wherein the core network is an IP network.

4. The method of claim 1 wherein the core network is an ATM network.

5. The method of claim 1 wherein a plurality of endpoints of the common cluster are connected over an ATM network.

6. The method of claim 1 wherein a plurality of endpoints of the common cluster are connected over a virtual channel network.

7. The method of claim 1 wherein a plurality of endpoints of the common cluster are connected over a TDM network.

8. The method of claim 1 wherein a plurality of endpoints of the common cluster are connected over a pre-resolved IP path network.

9. The method of claim 1 wherein a plurality of endpoints of the common cluster are connected over a Multi-Protocol Label Switching network.

10. The method of claim 1 wherein a plurality of endpoints of the common cluster are connected over a Virtual Local Area Network.

11. The method of claim 1 wherein a plurality of endpoints of the common cluster are connected over a pseudo-wire network.

12. A system for establishing a call comprising:
a first endpoint supported by a first media gateway and a second endpoint supported by a second media gateway;
a core network for communicatively coupling the first endpoint and the second endpoint;
a call control element, wherein the call control element is communicatively coupled with the core network;
a first processor coupled with the first media gateway;
a first memory coupled with the first processor and comprising instructions which, when executed by the first processor, causes the first media gateway to perform the following:
determine a first cluster attribute for the first endpoint;
wherein a cluster is a plurality of endpoints that are all connected to a same media gateway or mesh of interconnected media gateways operable to communicate with each other independently of the core network and an external call control element, wherein the cluster attribute indicates the one or more clusters to which a respective endpoint belongs and wherein the cluster attribute is transparent to the external call control element;
receive an establish call request from the external call control element;
establish a first call leg of the call via the core network;
receive a second cluster attribute from the second media gateway indicating clusters to which the second endpoint belongs;
determine whether the first endpoint and the second endpoint belong to a common cluster; and
if the first endpoint and the second endpoint belong to a common cluster then re-establish the first call leg on the same media gateway or via the media gateway mesh of the identified common cluster independent of the external call control element and the core network.

13. The system of claim 12, wherein the first memory further causes the first media gateway to send an establish response to the external call control element, wherein the establish response comprises the cluster attribute identifying a cluster network wherein the cluster attribute is transparent to the external call control element and wherein the cluster network comprises a communication link between the first media gateway and the second media gateway.

14. The system of claim 13, wherein the first memory further causes the first media gateway to establish a second call leg via the cluster network.

15. The system of claim 13, further comprising a second processor coupled with the second media gateway, and a second memory coupled with the second processor comprising instructions which, when executed by the second processor, cause the second media gateway to perform the following:
receive the establish response from the first media gateway via the external call control element; and
establish a second call leg on the same media gateway or via the media gateway mesh of the identified common cluster independent of the external control element and the core network.

16. An apparatus comprising:
a media gateway for converting data packets carried over a network, wherein the media gateway is configured to support a first endpoint wherein the first endpoint is a member of a cluster network wherein the cluster network is a plurality of endpoints that are all connected to a same media gateway or media gateway group;
an establish request receiver configured to receive an establish call request from a call control element via a core network, the establish call request for establishing a call between the first endpoint and a second endpoint;
a cluster attribute receiver configured to receive a cluster attribute contained in the establish call request identifying a cluster network of which the second endpoint is a member, wherein the cluster attribute is transparent to the call control element;
an alternate bearer determiner that inspects the cluster attribute of the second endpoint and determines whether the first and second endpoints are members of a common cluster network configured to communicate the call between the first endpoint and the second endpoint independent of the call control element and the core network; and
a first call leg establisher configured to establish a first call leg between the first endpoint and the second endpoint via the common cluster network.

17. The media gateway of claim 16 wherein the first call leg establisher is further configured to establish the first call leg via the core network.

18. The media gateway of claim 16 further comprising:
an establish call response sender that is configured to send an establish call response identifying the common cluster network to the second endpoint via the call control element and the core network; and
a second call leg establisher that is configured to establish a second call leg between the second endpoint and the first endpoint via the common cluster network responsive to the establish call response.

19. The media gateway of claim 16 wherein the cluster attribute contains a cluster network identification element for identifying the cluster and a cluster membership element identifying the endpoint belonging to the cluster network.

20. A computer-readable medium having stored thereon computer-implementable instructions which when executed on a computer processor cause a first media gateway to:
receive a establish call request from a call control element via a core network, wherein the establish call request comprises a cluster attribute of a second media gateway and requests a call between a first endpoint and a second endpoint and wherein the cluster attribute is transparent to the call control element;
establish a first call leg of the call via the core network;
inspect the cluster attribute wherein the cluster attribute identifies a cluster network of which the second endpoint is a member, wherein the cluster network is a plurality of endpoints that are all connected to a same media gateway and wherein the cluster attribute identifies the one or more clusters to which the respective endpoint belongs;
determine whether the first endpoint is a member of the cluster network; and
if the first endpoint is a member of the cluster network, re-establish the first call leg via the cluster network independent of the core network.

21. The computer-readable medium of claim 20, further causing the first media gateway to send an establish call response to the call control element, wherein the establish call response comprises the cluster attribute identifying the cluster network of which the first endpoint is a member.

22. The computer-readable medium of claim 20, further causing the first media gateway to establish a second call leg via the cluster network.

23. A media gateway for converting data packets carried over a network comprising:
means for receiving an establish request from a call control element via a core network, wherein the establish request requests a call between a first endpoint and a second endpoint;
means for communicatively coupling the media gateway and the first endpoint, wherein the first endpoint is for sourcing or sinking a media stream, or combinations thereof, and wherein the first endpoint is a member of a first cluster network;
means for receiving a cluster attribute identifying a second cluster network of which the second endpoint is a member;
wherein the second cluster network comprises a plurality of endpoints that are all connected to a same media gateway or group of interconnected media gateways;
wherein the cluster attribute contains a cluster network identification element for identifying the second cluster network and a cluster membership element identifying the endpoint belonging to the second cluster network and wherein the cluster network identification element is transparent to the call control element;
means for determining whether the first endpoint and the second endpoint belong to a same cluster network wherein the same cluster network is a common cluster network; and
means for establishing a first call leg between the first end point to the second endpoint via the common cluster network independent of the core network and the call control element responsive to determining the first endpoint and the second endpoint belong to the common cluster network.

24. The media gateway of claim 23 further comprising means for sending an establish call response comprising the cluster network identification element to the call control element via the core network to be forwarded to the second endpoint.

25. The media gateway of claim 23 further comprising means for establishing a second call leg via the common cluster network.

* * * * *

UNITED STATES PATENT AND TRADEMARK OFFICE
CERTIFICATE OF CORRECTION

| | |
|---|---|
| PATENT NO. | : 7,697,433 B2 |
| APPLICATION NO. | : 11/012372 |
| DATED | : April 13, 2010 |
| INVENTOR(S) | : Dahm et al. |

It is certified that error appears in the above-identified patent and that said Letters Patent is hereby corrected as shown below:

At column 7, line 15, please replace "IP" with --Internet Protocol (IP)--.
At column 7, line 18, please replace "ATM" with --Asynchronous Transfer Mode (ATM)--.
At column 7, line 25, please replace "TDM" with --Time Division Multiplexing (TDM)--.
At column 8, line 16, please replace "call leg" with --call leg of the call--.
At column 10, line 16, please replace "the endpoint" with --endpoints--.
At column 10, line 24, please replace "end point" with --endpoint--.

Signed and Sealed this
Third Day of May, 2011

David J. Kappos
*Director of the United States Patent and Trademark Office*